United States Patent
Chandraiah et al.

(10) Patent No.: US 6,904,210 B2
(45) Date of Patent: Jun. 7, 2005

(54) FIBER OPTIC RIBBON AND METHOD OF BUFFERING LOSS

(75) Inventors: Vidyananda Bangalore Chandraiah, Lawrcenville, GA (US); Kyoyul Oh, Alpharetta, GA (US); Kenneth Wade Jackson, Snellville, GA (US)

(73) Assignee: Fitel USA Corp., Norcross, GA (US)

( * ) Notice: Subject to any disclaimer, the term of this patent is extended or adjusted under 35 U.S.C. 154(b) by 257 days.

(21) Appl. No.: 10/200,681

(22) Filed: Sep. 17, 2002

(65) Prior Publication Data

US 2004/0052483 A1 Mar. 18, 2004

(51) Int. Cl.[7] .................................................. G02B 6/44
(52) U.S. Cl. ........................ 385/114; 385/114; 385/128
(58) Field of Search ................................ 385/114, 115, 385/128

(56) References Cited

U.S. PATENT DOCUMENTS

| | | | |
|---|---|---|---|
| 4,900,126 A | | 2/1990 | Jackson et al. ............ 350/46.23 |
| 5,062,685 A | * | 11/1991 | Cain et al. .................. 385/114 |
| 5,402,516 A | * | 3/1995 | Blyler et al. ................ 385/141 |
| 5,416,880 A | * | 5/1995 | Edwards et al. ............ 385/128 |
| 5,483,612 A | | 1/1996 | Gallagher et al. .......... 385/127 |
| 5,644,670 A | | 7/1997 | Fukuda et al. .............. 385/124 |
| 5,905,835 A | | 5/1999 | Bourghelle et al. ......... 385/114 |
| 6,175,677 B1 | | 1/2001 | Yang et al. ................. 385/114 |
| 6,253,013 B1 | | 6/2001 | Lochkovic et al. ......... 385/114 |
| 6,362,249 B2 | | 3/2002 | Chawla ....................... 522/182 |
| 6,498,882 B1 | * | 12/2002 | Buckelew et al. .......... 385/114 |
| 6,579,914 B1 | * | 6/2003 | Gantt et al. ................. 522/92 |
| 6,600,859 B2 | * | 7/2003 | Chandraiah et al. ........ 385/114 |
| 2001/0008906 A1 | * | 7/2001 | Chawla ....................... 522/90 |

* cited by examiner

Primary Examiner—Hemang Sanghavi
Assistant Examiner—Scott Alan Knauss
(74) Attorney, Agent, or Firm—Thomas, Kayden, Horstemeyer & Risley, LLP

(57) ABSTRACT

A fiber optic cable is disclosed that buffers against loss, where the cable includes an outer jacket, and an optical fiber ribbon disposed within the outer jacket, wherein the ribbon includes more than one optical fiber, and at least two distinct matrix coatings disposed on the optical fibers, the coatings having distinct characteristics. Preferably, the inner coating is relatively soft, with a lower elastic modulus than the relatively stiff, hard outer coating. Also disclosed is a method of buffering loss in an optical fiber transmission, including providing an optical fiber ribbon, wherein the ribbon includes more than one optical fiber, and at least two distinct matrix coatings disposed on the optical fibers, the coatings having distinct characteristics; and transmitting in at least one of the C-band, L-band and U-band of wavelengths.

19 Claims, 8 Drawing Sheets

Figure 5. Analytical simulation for the effect of the ratio of the undercoat to overcoat thickness (22:21) to the optical fiber cladding-primary coating interface.

Figure 6. Elastic modulus of a typical UV acrylate matrix material used in the optical fiber ribbon of FIG. 3 as a function of temperature.

Figure 7. Tan-delta of a typical UV acrylate matrix material used in the optical fiber ribbon of FIG. 3 as a function of temperature signifying the various glass transition temperature, Tg, of the materials.

Figure 8. The elastic modulus ratio of the undercoat to overcoat UV acrylate matrix material used in the optical fiber ribbon of FIG. 3 as a function of temperature.

FIBER OPTIC RIBBON AND METHOD OF BUFFERING LOSS

FIELD OF THE INVENTION

The present invention is generally related to fiber optics and, more particularly, is related to an apparatus and method for buffering loss in an optical fiber ribbon.

DESCRIPTION OF THE RELATED ART

Optical transmission systems have conventionally operated at the O band of optical wavelength, i.e., from 1260 to approximately 1310 nanometers (nm). However, because more and more data is now being transmitted over the systems, higher bit-rate systems are being developed that operate at longer wavelengths. As higher bit-rate transmission systems are being developed, new optical fiber designs with the desired optical properties will be required to handle high bit-rate, e.g., 40 Gbits/sec and beyond, and efficient E-, C-, L-, and U-band transmissions, i.e., at wavelengths from 1360 to 1460, 1530 to 1565, 1565 to 1625, and 1625 to 1675 nm, respectively. The next generation optical fibers, however, may tend to be more micro-bend sensitive because of having a larger effective area, which is required to handle higher power density of wavelength division multiplexing (WDM) transmissions.

The added optical transmission loss attributed from the fiber microbending has been reviewed and discussed in the field since the beginning of optical fiber development. Additionally, it has also been known that micro-bend loss increases substantially at longer wavelengths of light. Therefore, with the desirability of transmitting at a higher bit rate and over longer distances, the transmission band locations have steadily moved to longer wavelengths. These fibers tend to have a larger effective area, and as such often exhibit difficulty in meeting the desired attenuation level. In addition, such fibers also may be more sensitive to polarization mode dispersion (PMD).

As a means to capture the increase in the attenuation at longer wavelengths due to imposed microbending, a lab test has been devised to reproduce the phenomena. FIGS. 1 and 2 show the comparison of the spectral sweep of the attenuation of a typical 12-fiber ribbon wound on a production spool versus the experimental mandrel assembly that will impose a specified microbending. FIGS. 1 and 2 show the significant increase and fluctuations of attenuation levels around the L-and U-band areas.

Additionally, U.S. Pat. No. 5,062,685 to Cain et al. discloses optical cables comprising one or more glass optical fibers in a multilayer polymer coating. The multilayer coating includes a textured polymer outer layer and at least one soft buffer layer positioned between the textured polymer outer layer and the glass optical fiber or fibers, the buffer layer comprising a low Tg polymer and preferably having a layer thickness at least sufficient to maintain thermally induced microbending loss in the optical communication medium below about 0.5 db/km at medium operating temperatures in the range of 0° C. to −60° C.

The cables disclosed by Cain et al., however, are adapted for blow-in installation in existing duct work, and are not designed for new cable being laid in the field. Additionally, it may be desirable to reduce microbend loss by more than 0.5 db/km, and to have a cable that is capable of operating efficiently outside the temperature range of 0° C. to −60° C. Further, the microbend loss of the cables of Cain et al. is reduced when the signal wavelength is approximately 1300 nanometers (nm). It may be desirable to reduce microbend loss at wider temperature ranges and longer wavelengths than 1300 nanometers (nm).

Thus, a heretofore unaddressed need exists in the industry to address the aforementioned and/or other deficiencies and inadequacies related to the microbending/deformation of the fiber.

SUMMARY OF THE INVENTION

The present invention provides an apparatus and method for buffering loss in an optical fiber cable. Briefly described, one embodiment of the optical fiber cable, among others, includes an outer jacket; and an optical fiber ribbon disposed within the outer jacket, wherein the ribbon includes more than one optical fiber, and at least two distinct matrix coatings disposed on the optical fibers, the coatings having distinct characteristics. The two matrix coatings may include an undercoat and an overcoat, wherein the undercoat coats the individual optical fibers and fills the interstices therebetween, and the overcoat is disposed on and surrounds the undercoat, thereby forming the optical fiber ribbon. In a preferred embodiment, the undercoat is a soft coating and the overcoat can be a harder coating.

Having an optical fiber ribbon with at least two distinct matrix coatings disposed on the optical fibers has numerous advantages. For instance, combination of the distinct material characteristics (i.e. "hard" coating over a "soft" coating) enables easy individual fiber access without any special tools. In addition, the dual-or multiple-matrix ribbon design maintains the fiber accessing requirements that are set forth in the industry. Further, the dual-or multiple-matrix ribbon design is suitable for the industry standard single-and mass-fusion splicing requirements.

The present invention can also be viewed as providing methods for buffering optical loss in an optical fiber cable. In this regard, one embodiment of such a method, among others, can be broadly summarized by the following steps: providing an optical fiber ribbon, wherein the ribbon includes more than one optical fiber, and at least two distinct matrix coatings disposed on the optical fibers, the coatings having distinct characteristics; and transmitting in at least one of the C-band, L-band, and U-band of wavelengths.

Clearly, some embodiments of the invention may exhibit advantages in addition to, or in lieu of, those mentioned above. Additionally, other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a side cutaway view of an embodiment of the optical fiber ribbon of the present invention.

DETAILED DESCRIPTION

Figure 1:
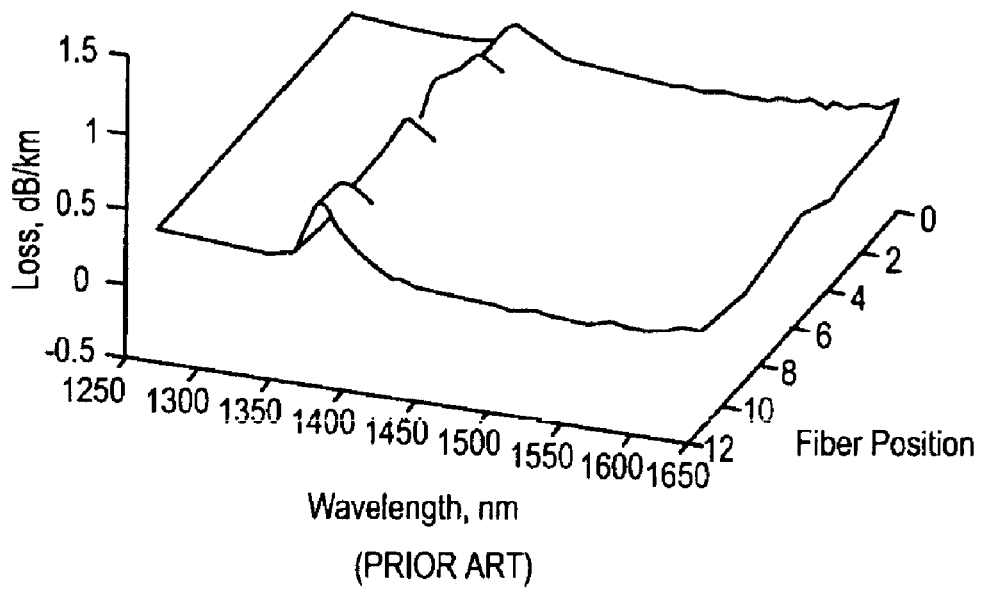
FIG. 1 is a graph depicting spectral loss of a prior art optical fiber ribbon showing a typical water peak at around 1383 nm.
Figure 2:
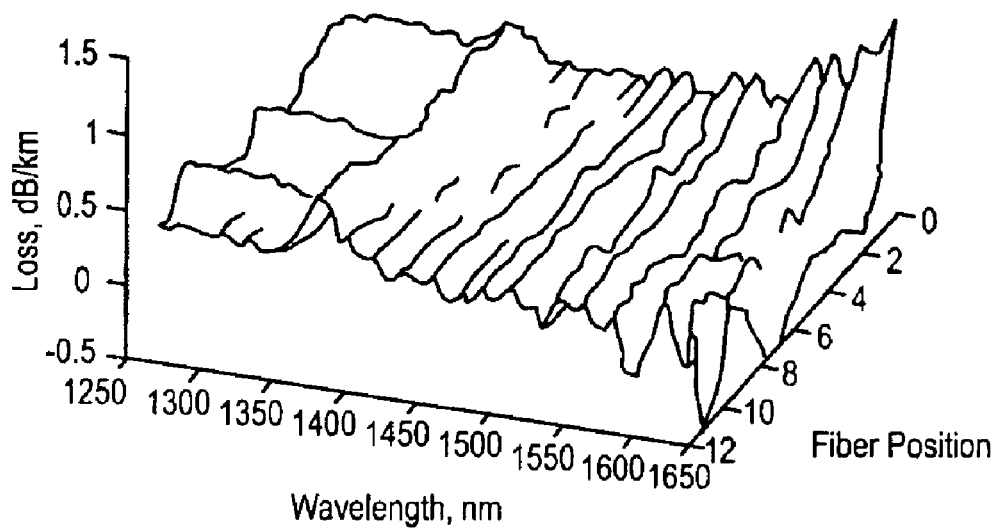
FIG. 2 is a graph depicting spectral loss of a prior art optical fiber ribbon subjected to prescribed microbend bending at C-, L-, and U-bands of optical wavelengths.
Figure 1:
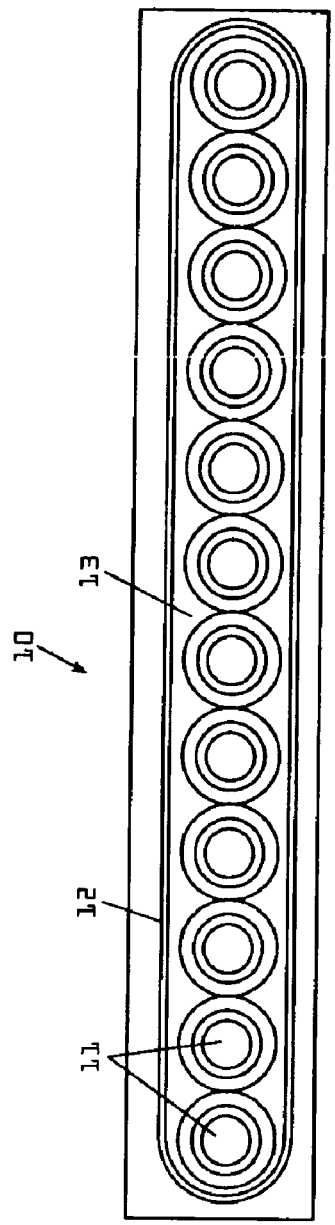

New ribbon designs are desired that buffer optical fibers in a suitable cable design in order to minimize added microbend loss that may be imposed due to the high microbend sensitivity of the next generation optical fibers, and environmental stresses such as thermal loading and rough core-tube surfaces. The invention includes dual or multiple layers of matrix coatings in an optical fiber ribbon structure, and a cable that includes the same. Preferably, the layers include at least one relatively soft inner layer and at least one relatively hard outer layer, analogous to primary and secondary coatings often used in an optical fiber structure. Important characteristics of the matrix layers are the ratio of their thicknesses, the ratio of their elastic moduli, and the difference in their glass transition temperatures (Tg).

In this regard, reference will now be made to the figures. FIG. 3 depicts a side cutaway view of an embodiment of the optical fiber ribbon 10 of the present invention. The ribbon 10 includes at least two optical fibers 11, a primary undercoat 13, and at least one secondary overcoat 12. The fibers 11 are preferably disposed adjacent each other in a horizontal plane, such that their outer layers abut each other. Disposed around the fibers 11 is the primary undercoat material 13 that coats the individual fibers 11 and fills any interstices therebetween. Disposed on and surrounding the undercoat 13 is the overcoat 12. While the ribbon 10 of FIG. 3 depicts a 12-fiber ribbon, it should be understood that any fiber count ribbon may be employed as the ribbon 10 of the present invention, including but not limited to a 2-fiber, 4-fiber, 6-fiber, 8-fiber, 12-fiber, and/or a 24-fiber ribbon.

Figure 4:
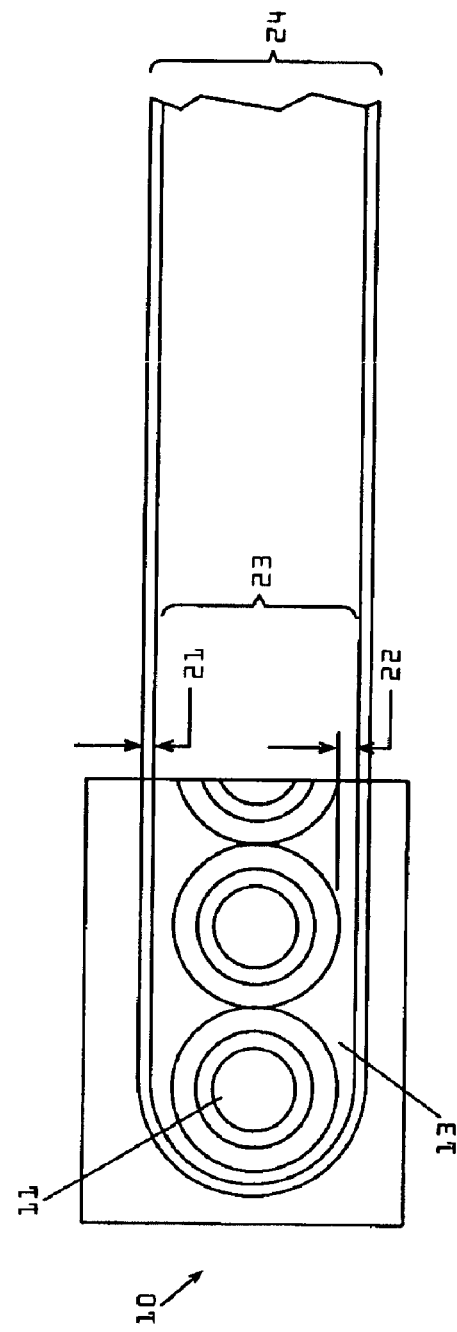
FIG. 4 is an exploded partial view of the optical fiber ribbon of FIG. 3.

FIG. 4 is an exploded view of a portion of the optical fiber ribbon of FIG. 3. Depicted are the thicknesses, over the optical fibers 11, for the overcoat coverage 21 and the undercoat coverage 22, as well as the total undercoat coverage 23 and the total ribbon thickness 24. The overcoat coverage 21 may range in thickness from approximately 20 microns (μm) to approximately 100 microns. The undercoat coverage 22 may range in thickness from approximately 25 microns to approximately 50 microns.

Figure 5:
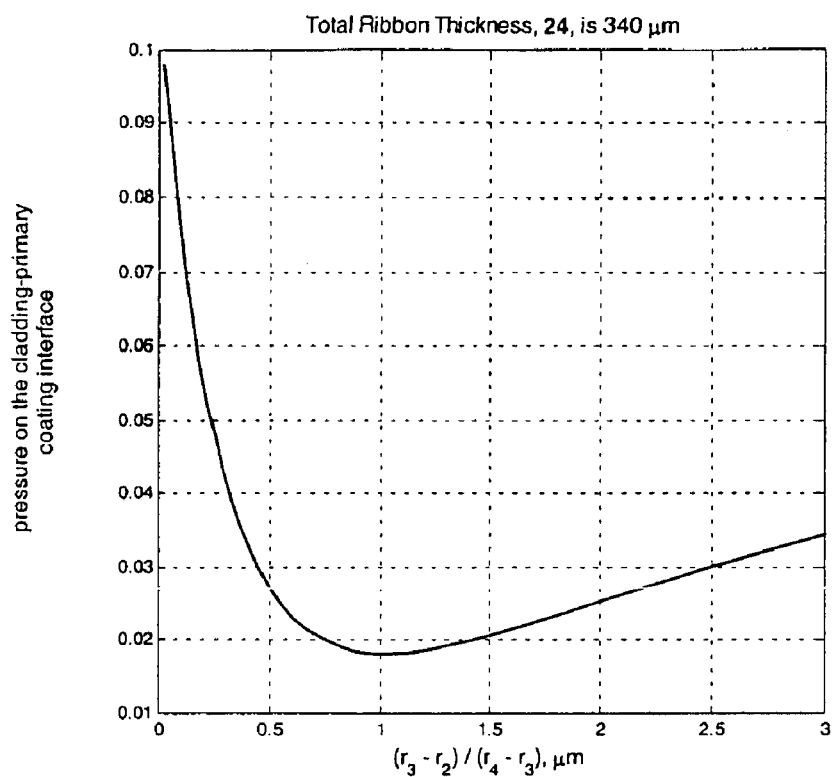
FIG. 5 is a graph of an analytical simulation for the effect of the ratio of the undercoat to overcoat thickness (22:21) to the pressure on the optical fiber cladding-primary coating interface used in the optical fiber ribbon of FIG. 3.

The ratio of the coverage thicknesses of undercoat 22 to overcoat 21, can be important for a given ribbon design to buffer against the imposed extrinsic stresses or pressure to the fiber, hence improving the microbend loss performance, as shown in FIG. 5. The optimization of the ratio of the coverage thicknesses at a given total ribbon thickness, 24, is important because a given ribbon design should conform to a standard optical fiber cable size.

The ratio of the undercoat to overcoat coverage thickness (22:21) can range from approximately 0.5 to 2.0. Preferably, the ratio of the undercoat to overcoat coverage thicknesses ranges from approximately 0.7 to 1.4. In a preferred embodiment the total undercoat thickness 23 is approximately 300 microns (μm), and the resulting total ribbon thickness 24 is approximately 340 microns (μm).

Figure 6:
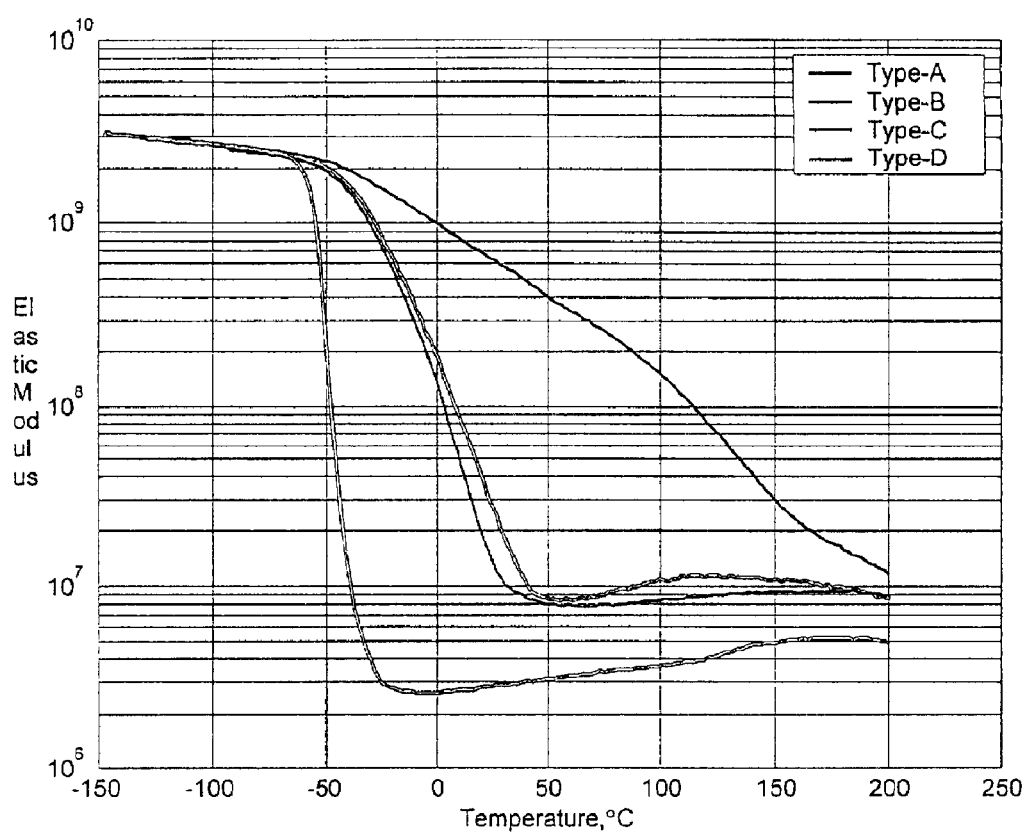
FIG. 6 is graph of an elastic modulus of a typical UV acrylate matrix material used in the optical fiber ribbon of FIG. 3 as a function of temperature.
Figure 7:
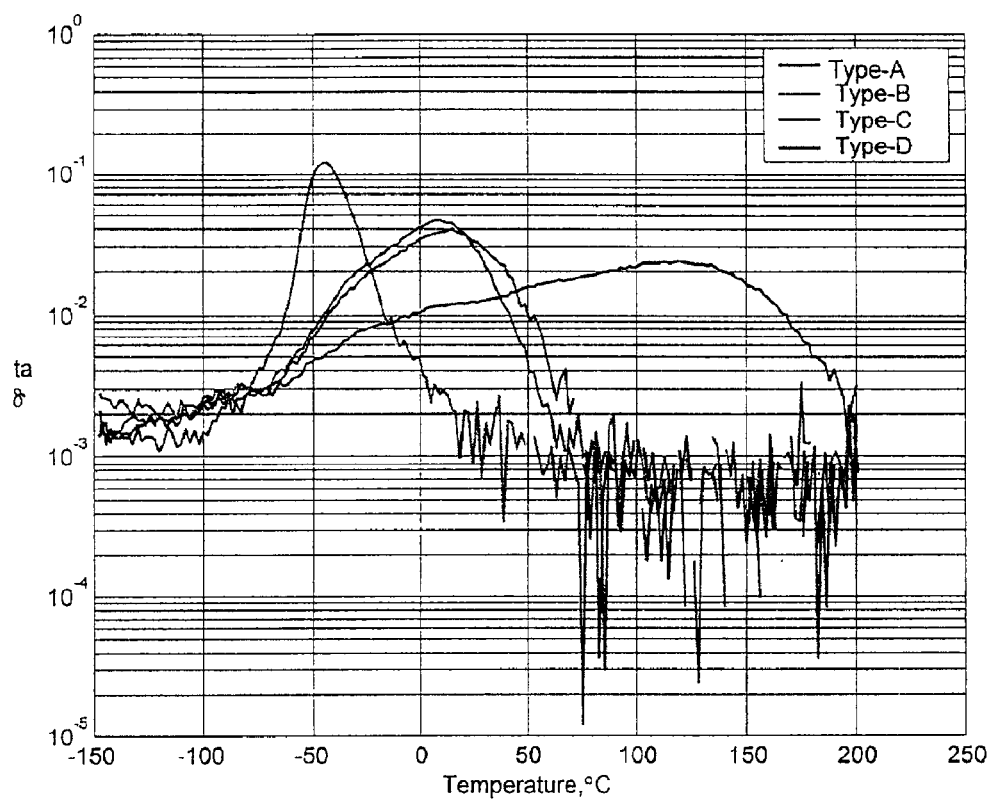
FIG. 7 is a graph of δtan (tan-delta) of a typical UV acrylate matrix material used in the optical fiber ribbon of FIG. 3 as a function of temperature, where the peak of the tan-delta curves signify the various glass transition temperature, Tg, of the materials listed.

The characteristics of the matrix modulii, as related to temperature over the expected operating temperature range, may also be an important part of the design. The elastic modulus curves for various UV acrylate material (labeled Types A, B, C and D), used in the dual-coated optical fiber ribbon 10 are shown in FIG. 6. The corresponding tan-delta (δtan) curves are also shown in FIG. 7. The peaks of the tan-delta in FIG. 7 typically denote the glass-transition point of the material, where the material changes from a "rubbery" to "glassy" state. The UV curable matrix A as described above, for example may be a mixture comprising a resin, a diluent, and a photoinitiator. The resin may include an aliphatic or aromatic urethane acrylate and/or an epoxy acrylate/methacrylate. The diluent may comprise monofunctional or multifunctional acrylic acid esters having a molecular weight of 100–1000 Daltons. For the photoinitiator, the composition may include for example ketonic compounds such as 1-hydroxycyclohexyl phenyl ketone, diethoxyacetophenone, acetophenone, benzophenone, benzoin, anthraquinone, and benzyl dimethyl ketal. The matrix A may include for example approximately 50–90 percent weight resin, approximately 5 to 10 percent diluents, and approximately 1 to 10 percent photoinitiator. Additives containing silicon (Si) or fluorine (F) atoms may be added to improve the release properties of the matrix material. An example of a suitable material includes DSM9-109™ manufactured by and commercially available from DSM Desotech, Inc. in Elgin, Ill. It should be noted that the present invention is in no way limited to this material, but rather may include any matrix material that meets the specifications listed herein.

In particular with fiber optic cables, the Tg may be important because the cable may be subjected to an environment in which the temperature varies from −60° C. to 85° C. Therefore, if the ribbon 10 is comprised of layers that have at least two distinct Tg's, then if the temperature drops and the cable is subjected to both thermal and external loads, the ribbon 10 will provide buffering for the fibers 11 by a material, preferably the undercoat 13, that is in a "rubbery" state. A rubbery undercoat 13 provides better buffering for the fibers when subjected to the external and/or the thermal loads than when the loads are applied to a material in a "glassy" state.

In a preferred embodiment, the overcoat 12 and undercoat 13 are two distinct UV acrylate materials that have a large difference in their glass transition temperatures, Tg, and large ratio of their modulii. Thus, it is desirable to have an undercoat 13 with a relatively low Tg; i.e. Type-D in FIG. 7. This lends the ribbon 10 particularly useful in coldtemperature environments due to its robustness to thermal stresses. The undercoat 13 in a preferred embodiment of the invention may have the Tg ranging from approximately −60° C. to approximately 120° C. The Tg of undercoat 13 may also range from approximately −43° C. to approximately 85° C. Preferably, the overcoat 12 has a higher Tg, thus "stacking" the Tg's to accommodate a wide range of temperatures at which the fiber optic cable may operate.

As noted hereinbefore, the cable may operate at a temperature ranging from approximately −60° C. to approximately 85° C. It is therefore desirable that overcoat 12 have a Tg that is somewhat higher than 85° C. so that the overcoat operates in a glassy state, rather than a rubbery one. Thus, the overcoat 12 may have a Tg that ranges from approximately 90° C. to approximately 150° C. Preferably, the overcoat 12 may have a Tg that ranges from approximately 120° C. to approximately 140° C. It is desirable to have the overcoat 12 operate at a temperature below its Tg so that the fibers 11, and their preferably "rubbery" undercoat 13, are protected by a glassy, harder outer shell. Therefore, difference in the glass transition temperatures of the two coatings may differ by as much as approximately 200° C.

As can be seen from FIG. 6, the Tg of the undercoat and overcoat materials is directly related to the elastic modulus of each respective material. In a preferred embodiment, the undercoat 13 is relatively soft, i.e., has a relatively low modulus. The undercoat 13 may have a modulus at room temperature that ranges from approximately 1 megapascal (MPa) all the way up to 1 gigapascal (GPa). The overcoat 12 may have a modulus that ranges from approximately 10 megapascal (MPa) all the way up to 1 gigapascal (GPa).

Figure 8:
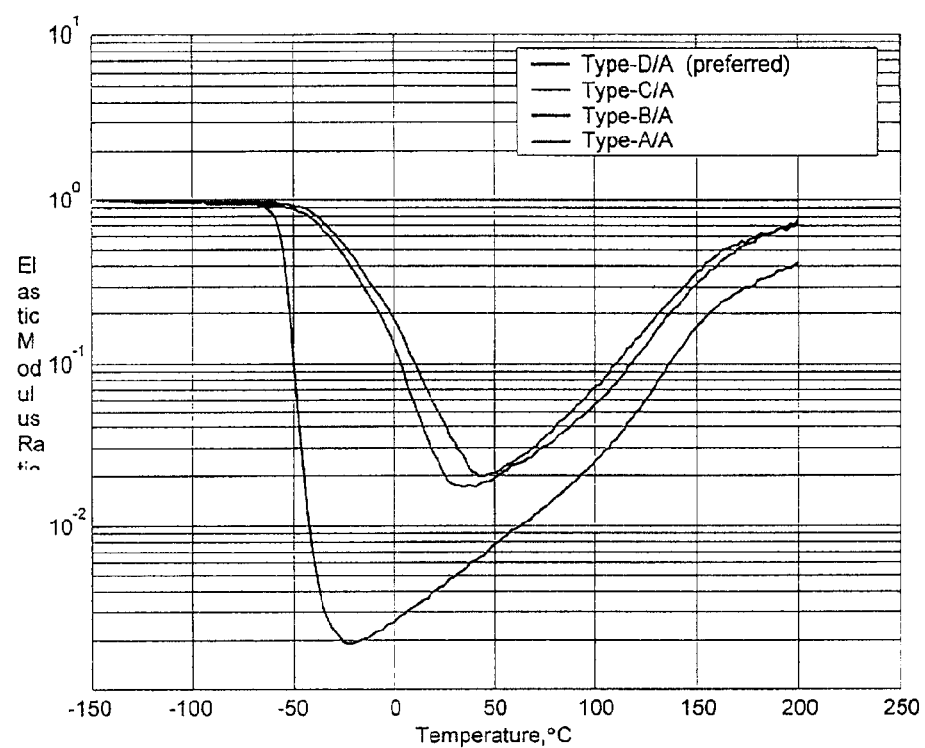
FIG. 8 is a graph of the ratio of the elastic modulus of the undercoat to overcoat UV acrylate matrix material used in the optical fiber ribbon of FIG. 3 as a function of temperature.

It is desirable but not necessary in the present invention to have a large ratio of the overcoat modulus to the undercoat modulus, i.e., that the undercoat is much softer than the overcoat so that the ribbon 10 includes fibers 11 are protected by the soft, rubbery undercoat 13 so that they are able to deform without adding undue stress on the fiber, and by an additional relatively hard, stiff overcoat 12 that further protects the ribbon 13 from an externally applied load and the resulting thermal loads from the environmental temperature cycles. In a preferred embodiment, the ratio of the elastic modulus of the undercoat to the elastic modulus of the overcoat ranges from approximately 1.000 to approximately 0.005 at room temperature. The temperature effect of the ratio between the undercoat to overcoat modulii are clearly depicted in FIG. 8, as it is one aspect of the present invention.

The elastic modulii of the exemplary materials considered for the ribbon 10 of the present invention were shown in FIG. 6. It should be noted that the elastic modulii of the materials graphed in FIG. 6 merely represent possible ribbon designs, and that the actual parameters of the characteristics may be outside these exact specifications, and yet still fall within the scope of the present invention.

Figure 9:
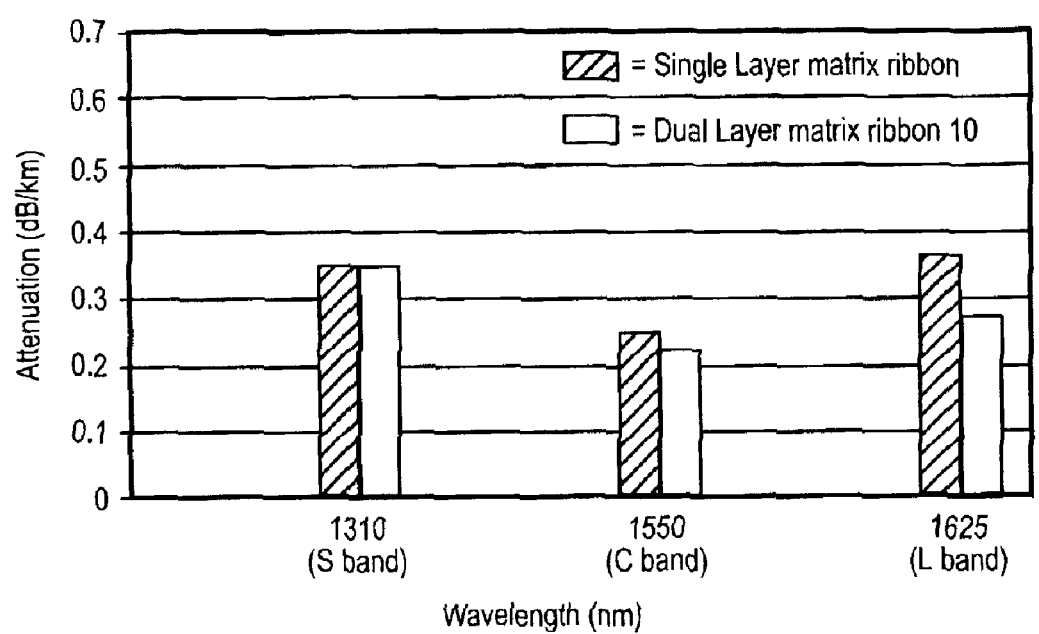
FIG. 9 is a bar graph comparing attenuation of single and dual layer matrix optical fiber ribbons in the typical transmission wavelengths of the O, C and L bands.

A preliminary test may be conducted at room temperature to compare the microbend performance of a current production, standard 12-fiber ribbon to a dual-coated 12-fiber ribbon 10 of the present invention. The test yields the results shown in the bar graph of FIG. 9. The results in FIG. 9 are for a ribbon 10 that is made to have the following exemplary physical parameters:

Total overcoat thickness 24: 340 microns ($\mu$m)

Ratio of undercoat coverage to overcoat coverage (22:21): 1.25

Ratio of the undercoat to overcoat matrix modulus: 1.00

Figure 10:
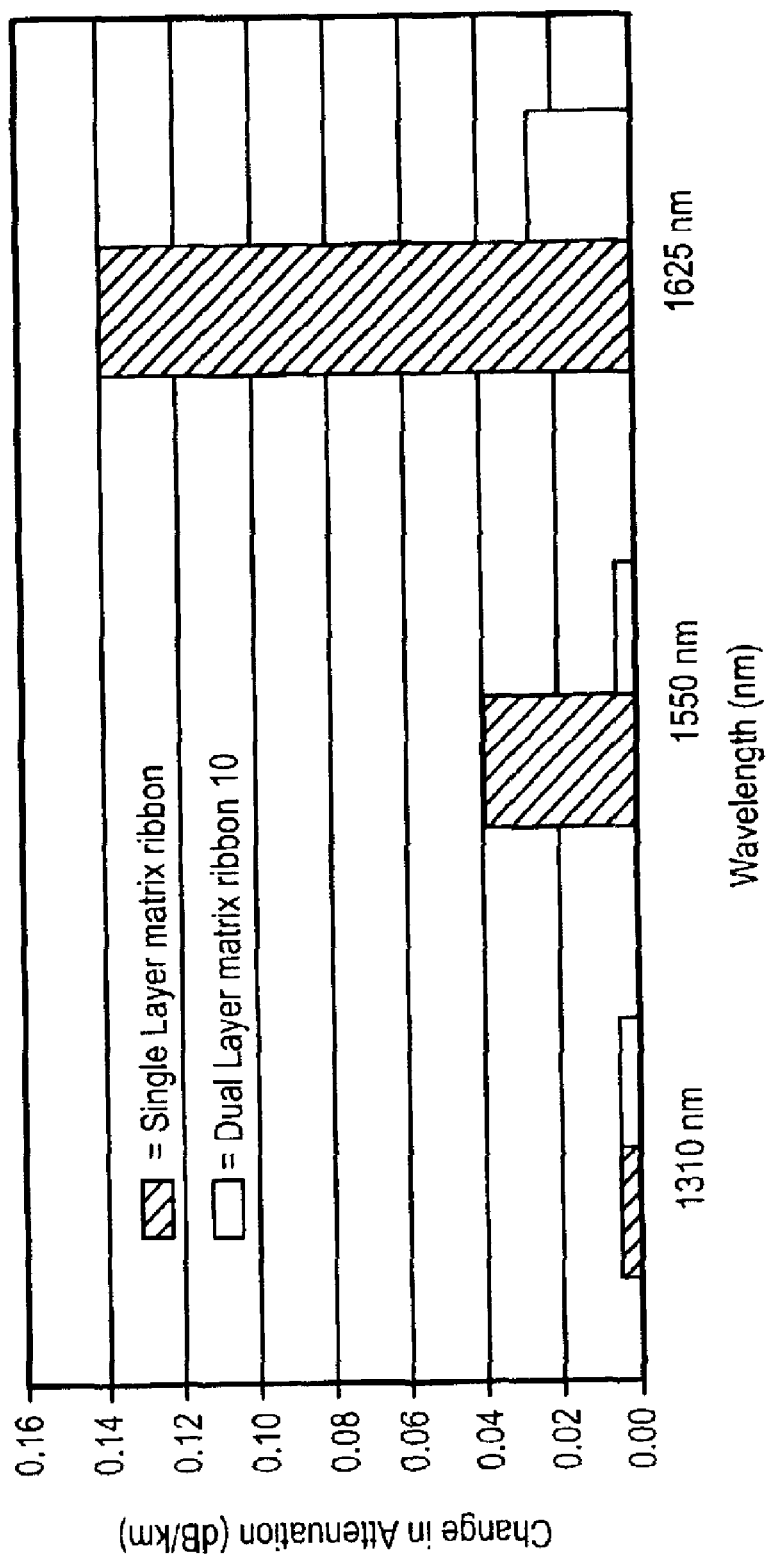
FIG. 10 is a bar graph comparing the change in the attenuation of FIG. 6, for single and dual layer matrix optical fiber ribbons in the typical transmission wavelengths of the O, C, and L bands.

FIG. 10 is a bar graph comparing the change in the attenuation of FIG. 9, for single and dual layer matrix optical fiber ribbons in the O, C and L bands of wavelengths. Of particular note, as can be seen in FIG. 9, and more clearly detailed in FIG. 10, the attenuation can be reduced by approximately 0.09 decibels/kilometer (dB/km) in the L band of wavelengths for the ribbon 10 of the present invention, compared to the conventional 12-fiber ribbon of the prior art having a single layer matrix. Thus, it can be conclusively determined that the multiple layer matrix design of the fiber optical ribbon of the present invention reduces attenuation and buffers loss of transmission, particularly at higher wavelengths due to microbending phenomena.

While the ribbon 10 of the present invention is particularly suited for reducing microbending loss, its application may be extended to lower the sensitivity of fibers 11 to polarization mode dispersion (PMD). The PMD are largely affected not only by the characteristics of the fiber itself, but also to external, e.g., stress-induced, loads to the fiber.

The present invention also includes methods for buffering optical loss in an optical fiber cable. In this regard, one embodiment of such a method, among others, includes providing an optical fiber ribbon 10, wherein the ribbon 10 includes more than one optical fiber 11, and at least two distinct matrix coatings disposed on the optical fibers 11, the coatings having distinct characteristics; and transmitting in at least one of the C-band, L-band, and U-band of wavelengths. The step of providing the optical fiber ribbon 10 includes both single and dual pass processing. The two coatings on the fibers 11 enhance the ability of the ribbon 10 to buffer loss in the cable.

The two matrix coatings provided in the method of the preferred embodiment include the undercoat 13 and the overcoat 12. The undercoat 13 coats the individual optical fibers 11 and fills the interstices there between, and the overcoat 12 is disposed on and surrounds the undercoat 13, thereby forming the optical fiber ribbon 10. The undercoat 13 and overcoat 12 provided in the optical fiber ribbon 10 possess the characteristics described above. In a preferred embodiment, the undercoat 13 and overcoat 12 lower the attenuation by at least 0.09 dB/km when the fibers 11 are operating in the L band of wavelength, i.e., at approximately 1625 nm.

Having an optical fiber ribbon with at least two distinct matrix coatings disposed on the optical fibers has numerous advantages. For instance, combination of the distinct material characteristics (i.e. "hard" coating over a "soft" coating) enables easy individual fiber access without any special tools. In addition, the dual-or multiple-matrix ribbon design maintains the fiber mid-span accessing requirements that are set forth in the industry. Further, the dual-or multiple-matrix ribbon design is suitable for the industry standard single-and mass-fusion splicing requirements. Thus, the ribbon design of the present invention not only buffers loss, but includes many other advantages, while still adhering to industry standards.

It should be emphasized that the above-described embodiments including any "preferred embodiments," of the present invention are merely possible examples of implementations, and are merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A fiber optic cable, comprising:
   an outer jacket; and
   an optical fiber ribbon disposed within the outer jacket, wherein the ribbon comprises
      more than one optical fiber configured to transmit in at least one of the C-band, L-band and U-band of wavelengths, and
      at least two distinct matrix coatings disposed on the optical fibers, the coatings having distinct characteristics, wherein the two matrix coatings comprise an undercoat and an overcoat,
      wherein the undercoat has a glass transition temperature that ranges from approximately −60° C. to approximately 120° C., and the overcoat has a glass transition temperature that ranges from approximately 90° C. to approximately 150° C.,
      wherein the undercoat coats the individual optical fibers and fills the interstices therebetween, and the overcoat is disposed on and surrounds the undercoat, thereby forming the optical fiber ribbon, and
      wherein the undercoat and the overcoat each forms a coverage over the optical fibers, and wherein the ratio of the coverage of the optical fibers by the undercoat to the coverage by the overcoat ranges from approximately 0.5 to approximately 2.0.

2. The cable of claim 1, wherein the undercoat is a soft coating and the overcoat is a hard coating.

3. The cable of claim 1, wherein the undercoat and overcoat have a large difference in their glass transition temperatures.

4. The cable of claim 3, wherein the difference in the glass transition temperatures of the two coatings is up to approximately 200° C.

5. The cable of claim 4, wherein the glass transition temperature of the undercoat is less than that of the overcoat.

6. The cable of claim 1, wherein the undercoat and the overcoat each have a separate elastic modulus, and wherein the elastic modulus of the undercoat at room temperature ranges from approximately 1 megapascal (MPa) to approximately 1 gigapascal (GPa), and the elastic modulus of the overcoat at room temperature ranges from approximately 10 MPa to approximately 1 GPa.

7. The cable of claim 6, wherein the ratio of the elastic modulus of the undercoat to the elastic modulus of the overcoat ranges from approximately 1.000 to approximately 0.005 at room temperature.

8. The cable of claim 1, wherein the undercoat and the overcoat each form a coverage over the optical fibers and wherein the undercoat coverage is of a different thickness than the overcoat coverage.

9. The cable of claim 1, wherein ratio of the coverage of the optical fibers by the undercoat to the coverage by the overcoat is from approximately 0.7 to approximately 1.4.

10. The cable of claim 1, wherein the undercoat thickness is approximately 300 microns, and the total ribbon thickness is approximately 340 microns.

11. The cable of claim 1, whereby the distinct matrix coatings enable end and mid-span access to the optical fiber without any special tools.

12. A method of buffering loss in an optical fiber transmission, comprising:
   providing an optical fiber ribbon, wherein the ribbon comprises
      more than one optical fiber, and
      at least two distinct matrix coatings disposed on the optical fibers, the coatings having distinct characteristics, wherein the two matrix coatings comprise an undercoat and an overcoat,
      wherein the undercoat has a glass transition temperature that ranges from approximately −60° C. to approximately 120° C., and the overcoat has a glass transition temperature that ranges from approximately 90° C. to approximately 150° C.,
      wherein the undercoat coats the individual optical fibers and fills the interstices therebetween, and the overcoat is disposed on and surrounds the undercoat, thereby forming the optical fiber ribbon, and
      wherein the undercoat and the overcoat each forms a coverage over the optical fibers, and wherein the ratio of the coverage of the optical fibers by the undercoat to the coverage by the overcoat ranges from approximately 0.5 to approximately 2.0; and
   transmitting in at least one of the C-band, L-band and U-band of wavelengths.

13. The method of claim 12, wherein the undercoat is a soft coating and the overcoat is a hard coating.

14. The method of claim 13, wherein the undercoat and overcoat have a large difference in their glass transition temperatures.

15. The method of claim 14, wherein the difference in the glass transition temperatures of the two coatings is up to approximately 200° C.

16. The method of claim 15, wherein the glass transition temperature of the undercoat is less than that of the overcoat.

17. The method of claim 12, wherein the undercoat and the overcoat each have a separate elastic modulus, and wherein the ratio of the elastic modulus of the undercoat to the elastic modulus of the overcoat ranges from approximately 1.000 to approximately 0.005 at room temperature.

18. The method of claim 12, wherein the undercoat and overcoat each form a coverage over the optical fibers, and wherein the undercoat coverage is of a different thickness than the overcoat coverage.

19. A method of reducing polarization mode dispersion in an optical fiber transmission, comprising:
   providing an optical fiber ribbon, wherein the ribbon comprises
      more than one optical fiber, and
      at least two distinct matrix coatings disposed on the optical fibers, the coatings having distinct characteristics, wherein the two matrix coatings comprise an undercoat and an overcoat, wherein the undercoat has a glass transition temperature that ranges from approximately −60° C. to approximately 120° C. , and the overcoat has a glass transition temperature that ranges from approximately 90° C. to approximately 150° C.,
      wherein the undercoat coats the individual optical fibers and fills the interstices therebetween, and the overcoat is disposed on and surrounds the undercoat, thereby forming the optical fiber ribbon, and
      wherein the undercoat and the overcoat each forms a coverage over the optical fibers, and wherein the ratio of the coverage of the optical fibers by the undercoat to the coverage by the overcoat ranges from approximately 0.5 to approximately 2.0; and
   transmitting in at least one of the C-band, L-band and U-band of wavelengths.

* * * * *